No. 783,950. PATENTED FEB. 28, 1905.
N. T. HARRINGTON.
VEHICLE FRAME.
APPLICATION FILED DEC. 6, 1904.
2 SHEETS—SHEET 1.
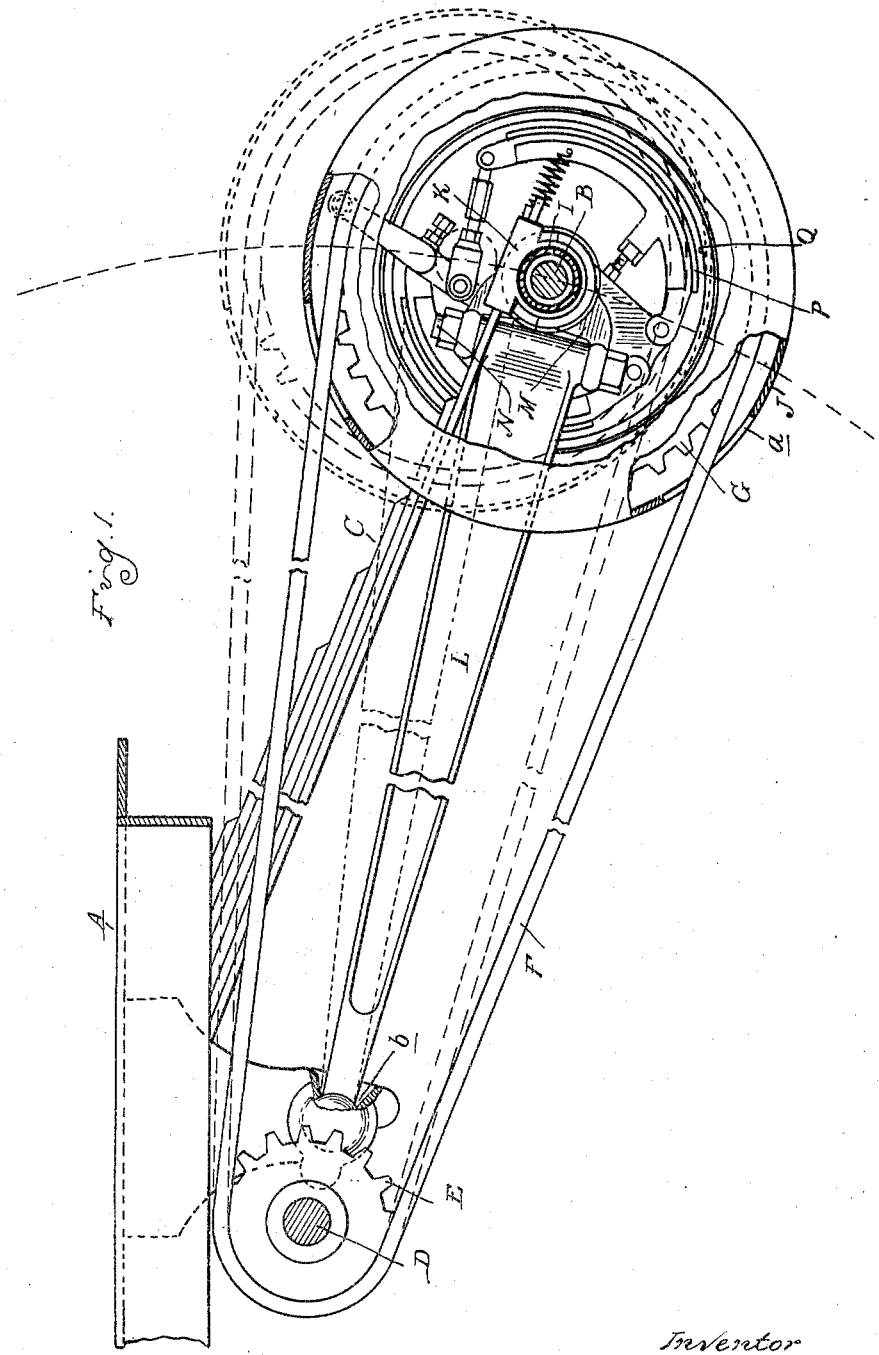

No. 783,950. PATENTED FEB. 28, 1905.
N. T. HARRINGTON.
VEHICLE FRAME.
APPLICATION FILED DEC. 6, 1904.
2 SHEETS—SHEET 2.
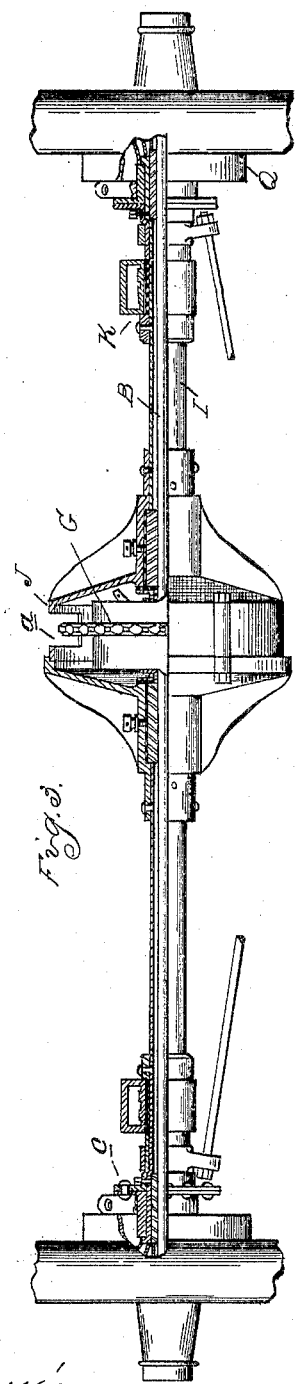
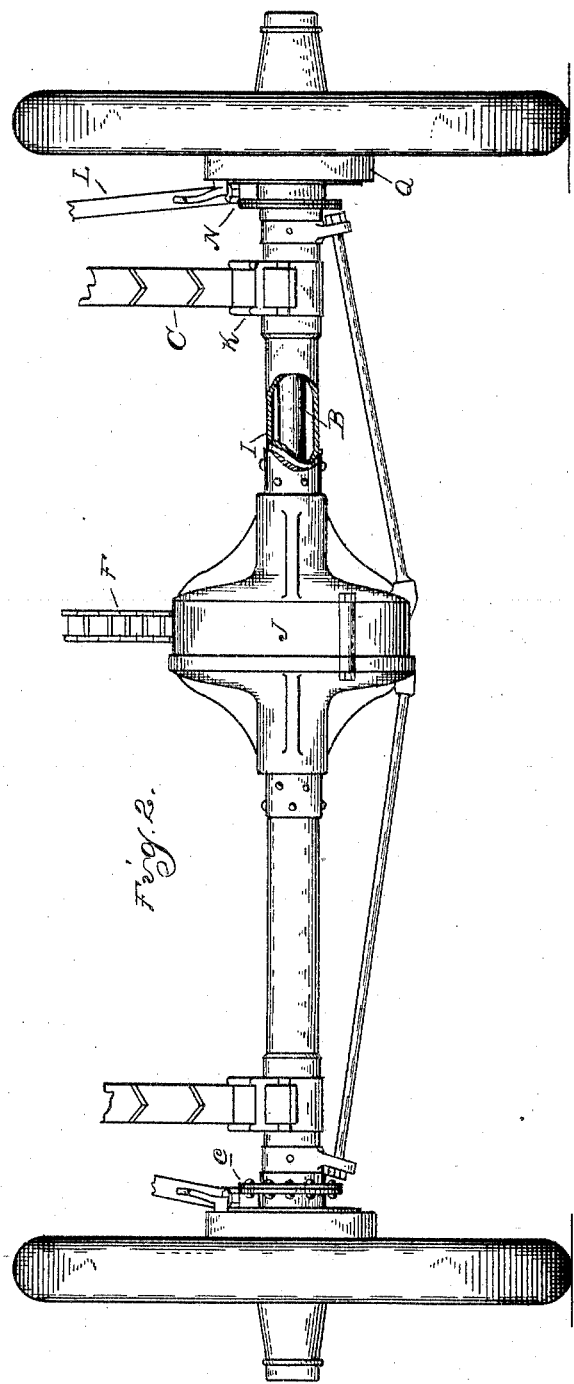
Witnesses
Inventor
Norman T. Harrington
By James Whittimore
Atty.

No. 783,950. Patented February 28, 1905.

UNITED STATES PATENT OFFICE.

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

VEHICLE-FRAME.

SPECIFICATION forming part of Letters Patent No. 783,950, dated February 28, 1905.

Application filed December 6, 1904. Serial No. 235,667.

*To all whom it may concern:*

Be it known that I, NORMAN T. HARRINGTON, a citizen of the United States, residing at Detroit, in the county of Wayne and State of Michigan, have invented certain new and useful Improvements in Vehicle-Frames, of which the following is a specification, reference being had therein to the accompanying drawings.

The invention relates to vehicle-frames more particularly designed for use on automobiles; and the invention consists in the construction, as hereinafter set forth.

In the drawings, Figure 1 is a sectional side elevation. Fig. 2 is a rear elevation of the rear axle. Fig. 3 is a section, partly in elevation, through the rear axle.

It is usual in the construction of motor-vehicles to provide a non-rotating housing for inclosing the drive-axle and compensating gearing, and where a chain-drive is employed the chain passes out through slots in the housing to the drive-shaft, which is mounted on the spring-frame. When the springs of the frame yield under load, the angularity of the chain is changed, and this sometimes causes the striking of the chain upon the edges of the slots.

It is one of the objects of my present invention to avoid this difficulty by providing means for rotating the housing to correspond with any change in angularity in the chain.

It is a further object to maintain the drive-axle at a constant distance from the drive-shaft, while permitting the independent flexing of the springs on opposite sides of the frame.

A is the frame of the vehicle, which, as shown, is supported on the drive-axle B through the medium of inclined spring-arms C. D is the drive-shaft, having a drive-sprocket E thereon, connected by a chain F with a sprocket G, preferably mounted on the compensating gear (not shown) for the drive-axle.

I is a tubular housing surrounding the drive-axle, and J is an enlargement on said housing which incloses the compensating gearing and sprocket, which is provided with the slots *a*, through which the drive-chain F passes. The housing I is connected with the spring-arm C through suitable connecting-fittings K, and these are loosely sleeved upon said housing, so as to permit of independent rotative movement.

L is a distance-rod for maintaining the axle in fixed relation to the drive-shaft. A pair of these rods are arranged on opposite sides of the frame and are connected therewith at their upper ends, preferably by a ball-and-socket joint *b* and in a line connecting the shaft D and axle B. At their lower ends these distance-rods are provided with heads M, which are mounted upon the axle at opposite ends of the tubular housing I. One of the heads M is rigidly attached to the housing I, as by means of the flanges *c*, which are bolted together. The other head is also mounted on the axle; but the flange *c* thereof is not secured to the flange of the housing, thus permitting of independent relative movement. The rods L and heads M are connected to each other by pivots N, which permit of a lateral movement of the axle in relation to the fulcrum. The heads M are employed for supporting the brake-shoes P, which engage with the brake-flanges Q, preferably attached directly to the ground-wheels for the rear axle.

The construction being as described, it is apparent that whenever the springs C are flexed, either under load on the frame A or by reason of an obstruction meeting one or both of the wheels, the distance-bars L will maintain the axle at uniform distance from the shaft D. At the same time the change in angularity of the distance-bars, which are fixed to the housing I, will cause the rotation of said housing about the axle, which will shift the position of the slots *a* to correspond with the shifting of the chain. This rotation of the housing is permitted by reason of the fact that the fittings K, which connect with the springs C, are loose thereon. In case one of the springs C is flexed to a greater extent than the other one there will be a difference in angularity between the two distance-rods L. Inasmuch, however, as the housing I is only connected to one of the distance-rods there will be no torsional strain exerted upon the housing.

What I claim as my invention is—

1. In a vehicle-frame, the combination with the body-supporting frame, the axle, and a spring between said axle and frame, of a housing surrounding said axle and a distance-bar for said axle fixed to and rotatable with said housing.

2. In a vehicle-frame, the combination with the body-supporting frame, the axle and a spring-support intermediate said axle and frame, of a housing inclosing said axle, a pair of distance-bars extending from said axle to said frame, one of said bars being rotatably fixed and the other being revoluble in relation to said housing.

3. In a vehicle-frame, the combination with the body-supporting frame, the axle and springs of the housing surrounding said axle, a brake-head and a distance-rod for said axle, rotatably fixed to said brake-head and said housing.

4. In a vehicle-frame, the combination with the body-supporting frame, of an axle, of a spring intermediate said axle and frame, a housing surrounding said axle, revoluble in relation to said spring, and a distance-bar for said axle rotatably fixed to said housing.

5. In a vehicle-frame, the combination with the body-supporting frame, of an axle, inclined springs extending from said frame to said axle, a housing surrounding said axle, revoluble in relation to said springs, a sprocket inclosed within said housing, a chain extending from said sprocket through slots in said housing, and a distance-bar for said axle rotatably fixed to said housing.

In testimony whereof I affix my signature in presence of two witnesses.

NORMAN T. HARRINGTON.

Witnesses:
H. C. SMITH,
ED. D. AULT.